(12) United States Patent
Zhang et al.

(10) Patent No.: US 8,981,592 B2
(45) Date of Patent: Mar. 17, 2015

(54) TRANSFORMER CONTROL DEVICE AND METHOD BASED ON THREE-DIMENSIONAL ZONE DIAGRAM POLICY

(75) Inventors: Huaguang Zhang, Shenyang (CN); Qiuye Sun, Shenyang (CN); Jun Yang, Shenyang (CN); Bin Jiang, Shenyang (CN); Lianzhi Wang, Shenyang (CN); Dazhong Ma, Shenyang (CN); Zhenwei Liu, Shenyang (CN); Fei Teng, Shenyang (CN); Zhiqiang He, Shenyang (CN); Xintong Li, Shenyang (CN)

(73) Assignees: Northeastern University, Shenyang, Liaoning Province (CN); Huaguang Zhang, Shenyang, Liaoning Province (CN); Qiuye Sun, Shenyang, Liaoning Province (CN); Jun Yang, Shenyang, Liaoning Province (CN); Bin Jiang, Shenyang, Liaoning Province (CN); Lianzhi Wang, Shenyang, Liaoning Province (CN); Dazhong Ma, Shenyang, Liaoning Province (CN); Zhenwei Liu, Shenyang, Liaoning Province (CN); Fei Teng, Shenyang, Liaoning Province (CN); Zhiqiang He, Shenyang, Liaoning Province (CN); Xintong Li, Shenyang, Liaoning Province (CN)

( * ) Notice: Subject to any disclaimer, the term of this patent is extended or adjusted under 35 U.S.C. 154(b) by 502 days.

(21) Appl. No.: 13/414,279

(22) Filed: Mar. 7, 2012

(65) Prior Publication Data

US 2013/0076130 A1    Mar. 28, 2013

(30) Foreign Application Priority Data

Sep. 28, 2011   (CN) .......................... 2011 1 0300966

(51) Int. Cl.
  *H02J 3/00*   (2006.01)
  *H02J 3/16*   (2006.01)
  *H02J 3/18*   (2006.01)
  *H02P 13/06*  (2006.01)

(52) U.S. Cl.
  CPC .. *H02J 3/16* (2013.01); *Y02E 40/34* (2013.01); *H02J 3/1878* (2013.01); *H02P 13/06* (2013.01)
  USPC ............................................................ 307/17

(58) Field of Classification Search
  CPC ................................. H02J 3/16; H02J 3/1878
  USPC ............................................................ 307/17
  See application file for complete search history.

(56) References Cited

U.S. PATENT DOCUMENTS

2008/0186009 A1*  8/2008  Tsang et al. ................... 323/356
2010/0264666 A1* 10/2010  Bo et al. .......................... 290/55

*Primary Examiner* — Rexford Barnie
*Assistant Examiner* — Toan Vu
(74) *Attorney, Agent, or Firm* — Muncy, Geissler, Olds & Lowe, P.C.

(57) ABSTRACT

Disclosed is a transformer control device and method based on a three-dimensional zone diagram policy. The method includes: setting transformers, including a transformer A and a transformer B; collecting three-phase voltage data and three-phase current data in a power system; rectifying the collected three-phase voltage data and the three-phase current data; transferring the data to the latches in a time-transfer method; transferring the data to an A/D converter of a processor to convert analog signals to digital signals; constructing a three-dimensional zone diagram in the processor; determining transformer operating conditions according to positions of points formed by voltage, reactive power factor and substation load; and adjusting the transformers. This invention adopts a simple, easy and clear three-parameter control policy including voltage, power factors and substation loads, so as to simplify analysis of transformer operating conditions, realize optimal substation operation, reduce transformer loss, and increase economic benefits.

2 Claims, 11 Drawing Sheets

TRANSFORMER CONTROL DEVICE AND METHOD BASED ON THREE-DIMENSIONAL ZONE DIAGRAM POLICY

BACKGROUND OF THE INVENTION

1. Field of the Invention

The present invention relates to the technical field of a power system transformer control, in particular to a transformer control device and method based on three-dimensional zone diagram policy.

2. The Prior Arts

With the rapid development of power industry, continuous grid expansion and dramatic power load growth enable people to have more requirements for power quality and reliability. The voltage of a power system is an important parameter to determine power quality. Large voltage fluctuation not only can affect efficiency and worklife of electrical equipment, but also can lead to voltage collapse and even serious accidents caused by blackout. Transformers are important power equipment in a power system. In a power system, the total number of transformers is more than that of generators, and the total capacity of transformers is much higher than the total capacity of generators and the total capacity of electric motors, so power loss of transformers accounts for total power loss of the whole power system of about 30%. Therefore, operating conditions of transformers have direct effects on economical operation of power systems, and low power factors even affect economical operation of wires and transformers, which are extremely unfavorable for energy saving and improvement of power supply capability of power equipment. In order to ensure stable and economical operation of the grid, operating conditions of transformers must also be optimized when power quality is improved, power factor is increased, and energy loss is reduced.

Common plane-zone diagram methods mainly include nine-zone diagram method and improvements thereof and five-zone diagram method. The nine-zone diagram method is a basic method for general control of substation voltage and is a typical two-parameter control policy including voltage and power factor. In the nine-zone diagram method, a voltage-reactive plane is divided into 9 zones according to constant voltage and upper and lower limits of the power factor, as shown in FIG. 1. In FIG. 1, the ordinate represents the voltage U on the low voltage side of the transformer, the abscissa represents the power factor $\cos \phi$ on the high voltage side of the transformer, $U_H$ represents upper voltage limit, $U_L$ represents lower voltage limit, $\cos \phi_L$ represents the lower limit of the power factor, and $\cos \phi_H$ represents the upper limit of the power factor. The ordinate and the abscissa are respectively divided into three sections with the parameters. For the ordinate, if a point is higher than $U_H$, then the voltage is out of the upper voltage limit; if a point is lower than $U_L$, then the voltage is out of the lower voltage limit. For the abscissa, if a point is higher than $\cos \phi_H$ then the power factor is out of the upper limit; if a point is lower than $\cos \phi_L$, then the power factor is out of the lower limit. The nine-zone diagram aims to control the voltage and the power factor within the upper limit and the lower limit, namely within the range of the nine zones. If the voltage and the power factor do not meet the requirements at the same time, the voltage should take precedence over the power factor.

In addition to the traditional nine-zone diagram, many researchers study on the traditional nine-zone diagram for some improvements. At present, common improved zone methods include eleven-zone diagram method, fifteen-zone diagram method, seventeen-zone diagram method, etc.

The plane of the eleven-zone diagram method is shown in FIG. 2. The eleven-zone diagram method is almost similar to the nine-zone diagram method, but one sub-zone is respectively added to the original Zone 2 and Zone 6 to prevent equipment vibration and frequent operation. According to the control policy, when the operating condition is in Zone 8, the control policy of the traditional nine-zone diagram method is used, i.e. transformer taps should be adjusted first to increase the voltage. If the transformer taps are adjusted to the top position, the capacitors should be switched on. Then, the operating condition is in Zone 9 or Zone 20, so adjustment is not necessary. If the transformer taps are not in the top position, the operating condition will enter Zone 20 after the transformer taps are adjusted to a higher position. Then, the transformer taps are adjusted to a much higher position, and the capacitors are switched off, so that the operating condition enters Zone 2 first before entering Zone 9. Therefore, the control policy can effectively prevent equipment vibration and frequent operation.

The plane-zone diagram of the fifteen-zone diagram method is shown in FIG. 3. The difference between the fifteen-zone diagram and the traditional nine-zone diagram is that two dotted lines are added between the upper voltage limit and the lower voltage limit. The dotted lines in FIG. 3 represent critical parameters, the zone between the dotted lines represents the voltage acceptable zone, and the zones on two sides of the dotted lines represent voltage dead zones. The critical parameters are set as required. Compared with the traditional nine-zone diagram, the fifteen-zone diagram has six more control zones and has the advantages of more precise control and less equipment operations.

The plane-zone diagram of the seventeen-zone diagram method is shown in FIG. 4. In the seventeen-zone diagram method, the control policy adopts automatic timing and is self-adaptive to the wiring of the system. According to requirements of the system, five control policies can be adopted, including consideration of voltage only, consideration of reactive power only, voltage precedence, reactive power precedence and overall consideration. Different zones need different control policies. In general, voltage precedence should be considered first for a substation, and then reactive power.

The five-zone diagram adopts the voltage reactive power control (VQC) principle and has totally different controlled objects from the traditional nine-zone diagram. The principle is estimated based on operation effects, is determined according to quality distances and is used for VQC devices, as shown in FIG. 5.

According to characters of operating actions to VQC devices, the operating actions include:

No action
Higher transformer position
Lower transformer position
Switching capacitors on
Switching capacitors off The optimal operating action is selected according to given controlled objects and locked constraints as the final operation, so the control concept forms, in which operating actions to VQC devices are directly utilized as controlled objects. Therefore, compared with the nine-zone diagram, the five-zone diagram has more precise and more effective control policy.

A vector diagram can be obtained as shown in FIG. 6 by vectoring current operating conditions on the U-Q plane with the five operations above.

In the text above, the two-parameter control policy of the voltage-power factor (reactive power) is considered. However, in the actual operation of a substation, another important parameter is not considered, namely operating conditions of transformers. Therefore, some problems may occur, for example:

(1) A substation has multiple transformers. When both the voltage and the power factor are satisfied, operators cannot determine the operating mode to optimize the operating mode of the substation.

(2) The operating mode of the transformers is determined according to the economy load parameter of the transformers only without considering the voltage and the power factor. Although transformer load factor is equal to the economy load parameter, the power factor is very low, so transformer loss is not the minimum.

SUMMARY OF THE INVENTION

In terms of the disadvantages of the prior art, the present invention provides a transformer control device method based on three-dimensional zone diagram policy. The present invention aims to enable transformers to operate in the optimal operating mode and reduce transformer loss.

A transformer control device based on three-dimensional zone diagram policy according to the present invention comprises: a current input, a voltage input, a channel selector, a rectifier, a single-chip microcomputer, a data memory, an interrupt processor, a data buffer, a keyboard display chip, a first latch and a second latch. The output terminal of the current input is connected with the first input terminals of the channel selector, the output terminal of the voltage input is connected with the second input terminals of the channel selector, and the output terminal of the channel selector is connected with the input terminal of the rectifier; the output terminal of the rectifier is connected with the input terminal of the first latch, the output terminal of the first latch is connected with the A/D input terminal of the single-chip microcomputer, and the input/output terminal of the single-chip microcomputer is connected with the input/output terminal of the second latch; the output terminal of the single-chip microcomputer is connected with the first input terminal of the data memory, the first output terminal of the second latch is connected with the second input terminal of the data memory, and the second output terminal of the second latch is connected with the input terminal of the data buffer; the third output terminal of the second latch is connected with the data terminal of the keyboard display chip, and the fourth output terminal of the second latch is connected with the input/output terminal of the interrupt processor.

A transformer control method based on three-dimensional zone diagram policy, in which the transformer control device based on three-dimensional zone diagram policy is used. The method comprises the following steps of:

Step 1: Setting transformers in a power system, including a transformer A and a transformer B, and collecting three-phase voltage data and three-phase current data in the power system;

Step 2: Rectifying the three-phase voltage data and the three-phase current data collected in Step 1, and transferring the data to the latches in a time-transfer method; the time-transfer method comprises the following steps of: Directly transferring a set of original three-phase voltage data to the latches; after one cycle, transferring collected real-time current data to the latches; after one more cycle, transferring power data to the latches; and outputting the three sets of data from the latches;

The three-phase voltage data in the latches are not equal to the real-time voltage data after 2 cycles, so compensation is necessary. The voltage compensation formula is as follows:

$$\frac{du}{dt} = \frac{\Delta u}{\Delta t} = \frac{u_N - u_0}{t_N - t_0} \quad (1)$$

Where $\Delta u$=Voltage variation in the 2 cycles; $\Delta t$=2 cycles; $u_N$=Current voltage; $u_0$=Latched voltage; $t_N$=Current time; and $t_0$=Voltage latching time.

The current data in the latches are not equal to real-time current data after 1 cycle, so compensation is necessary. The compensation method is the same as the voltage compensation method. The current compensation formula is as follows:

$$\frac{di}{dt} = \frac{\Delta i}{\Delta t'} = \frac{i_N - i_0}{t'_N - t'_0}$$

Where $\Delta i$=Current variation after 1 cycle; $\Delta t'$=1 cycle; $i_N$=Present current; $i_0$=Latched current; $t'_N$=Current time; and $t'_0$=Current latching time.

Step 3: Transferring the data processed in Step 2 to an A/D converter of the single-chip microcomputer to convert analog signals to digital signals, and constructing a three-dimensional zone diagram in the processor.

The three-dimensional zone diagram means that substation load is added to a two-dimensional nine-zone diagram to form a three-dimensional zone diagram comprising three coordinate axes of three-phase voltage U, reactive power factor COS φ and substation load S.

The three-dimensional zone diagram is named by the following rule: (a) Number sequence in each layer is the same as that of traditional nine-zone diagrams; (b) Serial numbers of the S axis are sequenced in an ascending order along the forward of the S axis according to critical load power; when the S axis is divided into N sections, the bottom serial number is 1, and the top serial number is N; the critical load means the load value when the operating mode of a transformer changes.

To sum up, in the three-dimensional zone diagram, each zone number comprises double digits; the first digit represents the layer of the S axis, and the second digit represents the position of the zone in the layer corresponding to the traditional nine-zone diagram. Therefore, 9 zones in the bottom layer are numbered from 11 to 19, 9 zones in the middle layer are numbered from 21 to 29, and 9 zones in the top layer are numbered from 31 to 39.

The method for constructing a three-dimensional zone diagram comprises the following steps of:

Step 3-1: Constructing a three-dimensional coordinate system with the three-phase voltage, the reactive power factor and the substation load.

Step 3-2: Determining critical load power limits in the method that critical load is determined according to parameters on the nameplate of a transformer, i.e. critical load can be determined as long as the type of the transformer in a target substation is known.

Step 3-3: Determining three-phase voltage limits in the following two methods:
(1) The upper limit of the voltage is set as the maximum acceptable positive offset or a value 2% less than the maximum offset, and the lower limit of the voltage is set as the maximum acceptable negative offset or a value 2% greater than the maximum negative offset.

(2) A time period is divided into several sub-periods, and voltage limits are set respectively based on the sub-periods; the time period can be 1 day, 1 week or 1 month.

The three-phase voltage limits determined in method (1) and method (2) are corrected in a contrary voltage control method. The contrary voltage control method is performed by increasing the center point voltage at the peak load and reducing the center point voltage at the trough load. Compensation effects of contrary voltage control are optimized by making the voltage operate towards the upper limit at peak load and increasing the lower voltage limit, or making the voltage operate towards the lower limit at trough load and reducing the upper voltage limit.

Step 3-4: Determining reactive power factor limits in the following two methods:

(1) Reactive power factor limits are set as constant values in the following method: The reactive power factor limits are set based on requirements of the substation for the power factor according to one of the following rules:

Rule 1: The substation requires that the power factor should not be less than 0.9 at the maximum load, and the closer to 1 the better. Therefore, the upper power limit is set as 1, and the lower power limit is set as 0.9.

Rule 2: Substations of 110 KV or less are not allowed to transfer reactive power back to the grid. Therefore, the lower limit of the reactive power is set as 0, and the upper limit of the reactive power is set as 1.3 times higher than reactive power of a single capacitor.

(2) Reactive power limits are set with curves by dividing a time period into several sub-periods according to the requirements of the substation, and reactive power factor limits are set respectively based on the sub-periods; the time period can be 1 day, 1 week or 1 month.

Method (1) and method (2) above are corrected in the same contrary voltage control method as Step 3-3.

Step 4: Determining transformer operating conditions according to points of the voltage, the reactive power factor and the substation load in the three-dimensional zone diagram, and adjusting the transformer in the three-dimensional zone diagram method and the three-dimensional zone diagram projection method. The three-dimensional zone diagram method comprises the following steps of setting $S_L^{A\sim B}$ as the low critical load, and setting $S_L^{B\sim AB}$ as the high critical load.

If the points are in Zone 11, then the voltage is out of the lower voltage limit, the power factor is out of the upper limit, and the load power is lower than $S_L^{A\sim B}$. The transformers should be adjusted by the method that transformer taps are raised first, the capacitors are switched off, and meanwhile, transformer A operates independently.

If the points are in Zone 12, then the voltage is acceptable, the power factor is out of the upper limit, and the load power is lower than $S_L^{A\sim B}$. The transformers should be adjusted by the method that the capacitors are switched off, and meanwhile, transformer A operates independently.

If the points are in Zone 13, then the voltage is out of the upper voltage limit, the power factor is out of the upper limit, and the load power is lower than $S_L^{A\sim B}$. The transformers should be adjusted by the method that the capacitors are switched off, transformer taps are lowered, and meanwhile, transformer A operates independently.

If the points are in Zone 14, then the voltage is out of the upper voltage limit, the power factor is acceptable, and the load power is lower than $S_L^{A\sim B}$. The transformers should be adjusted by the method that transformer taps are lowered, and meanwhile, transformer A operates independently.

If the points are in Zone 15, then the voltage is out of the upper voltage limit, the power factor is out of the lower limit, and the load power is lower than $S_L^{A\sim B}$. The transformers should be adjusted by the method that transformer taps are lowered, the capacitors are switched on, and meanwhile, transformer A operates independently.

If the points are in Zone 16, then the voltage is acceptable, the power factor is out of the lower limit, and the load power is lower than $S_L^{A\sim B}$. The transformers should be adjusted by the method that the capacitors are switched on, and meanwhile, transformer A operates independently.

If the points are in Zone 17, then the voltage is out of the lower voltage limit, the power factor is out of the lower limit, and the load power is lower than $S_L^{A\sim B}$. The transformers should be adjusted by the method that capacitors are switched on, transformer taps are raised, and meanwhile, transformer A operates independently.

If the points are in Zone 18, then the voltage is out of the lower voltage limit, the power factor is acceptable, and the load power is lower than $S_L^{A\sim B}$. The transformers should be adjusted by the method that transformer taps are raised, and meanwhile, transformer A operates independently.

If the points are in Zone 19, then the voltage is acceptable, the power factor is acceptable, and the load power is lower than $S_L^{A\sim B}$. The transformers should be adjusted by the method that transformer taps are kept in the original position, the capacitors remain in the same condition, and meanwhile, transformer A operates independently.

If the points are in Zone 21, then the voltage is out of the lower voltage limit, the power factor is out of the upper limit, and the load power is between $S_L^{A\sim B}$ and $S_L^{B\sim AB}$. The transformers should be adjusted by the method that transformer taps are raised first, the capacitors are switched off, and meanwhile, transformer B operates independently.

If the points are in Zone 22, then the voltage is acceptable, the power factor is out of the upper limit, and the load power is between $S_L^{A\sim B}$ and $S_L^{B\sim AB}$. The transformers should be adjusted by the method that the capacitors are switched off, and meanwhile, transformer B operates independently.

If the points are in Zone 23, then the voltage is out of the upper voltage limit, the power factor is out of the upper limit, and the load power is between $S_L^{A\sim B}$ and $S_L^{B\sim AB}$. The transformers should be adjusted by the method that the capacitors are switched off first, transformer taps are lowered, and meanwhile, transformer B operates independently.

If the points are in Zone 24, then the voltage is out of the upper voltage limit, the power factor is acceptable, and the load power is between $S_L^{A\sim B}$ and $S_L^{B\sim AB}$. The transformers should be adjusted by the method that transformer taps are lowered, and meanwhile, transformer B operates independently.

If the points are in Zone 25, then the voltage is out of the upper voltage limit, the power factor is out of the lower limit, and the load power is between $S_L^{A\sim B}$ and $S_L^{B\sim AB}$. The transformers should be adjusted by the method that transformer taps are lowered first, the capacitors are switched on, and meanwhile, transformer B operates independently.

If the points are in Zone 26, then the voltage is acceptable, the power factor is out of the lower limit, and the load power is between $S_L^{A\sim B}$ and $S_L^{B\sim AB}$. The transformers should be adjusted by the method that the capacitors are switched on, and meanwhile, transformer B operates independently.

If the points are in Zone 27, then the voltage is out of the lower voltage limit, the power factor is out of the lower limit, and the load power is between $S_L^{A\sim B}$ and $S_L^{B\sim AB}$. The transformers should be adjusted by the method that capacitors are switched on, transformer taps are raised, and meanwhile, transformer B operates independently.

If the points are in Zone 28, then the voltage is out of the lower voltage limit, the power factor is acceptable, and the load power is between $S_L^{A\sim B}$ and $S_L^{B\sim AB}$. The transformers should be adjusted by the method that transformer taps are raised, and meanwhile, transformer B operates independently.

If the points are in Zone 29, then the voltage is acceptable, the power factor is acceptable, and the load power is between $S_L^{A\sim B}$ and $S_L^{B\sim AB}$. The transformers should be adjusted by the method that transformer taps are kept in the original position, the capacitors remain in the same condition, and meanwhile, transformer B operates independently.

If the points are in Zone 31, then the voltage is out of the lower voltage limit, the power factor is out of the upper limit, and the load power is higher than $S_L^{B\sim AB}$. The transformers should be adjusted by the method that transformer taps are raised first, the capacitors are switched off, and meanwhile, transformers A and B operate in parallel.

If the points are in Zone 32, then the voltage is acceptable, the power factor is out of the upper limit, and the load power is higher than $S_L^{B\sim AB}$. The transformers should be adjusted by the method that the capacitors are switched off, and meanwhile, transformers A and B operate in parallel.

If the points are in Zone 33, then the voltage is out of the upper voltage limit, the power factor is out of the upper limit, and the load power is higher than $S_L^{B\sim AB}$. The transformers should be adjusted by the method that the capacitors are switched off, transformer taps are lowered, and meanwhile, transformers A and B operate in parallel.

If the points are in Zone 34, then the voltage is out of the upper voltage limit, the power factor is acceptable, and the load power is higher than $S_L^{B\sim AB}$. The transformers should be adjusted by the method that transformer taps are lowered, and meanwhile, transformers A and B operate in parallel.

If the points are in Zone 35, then the voltage is out of the upper voltage limit, the power factor is out of the lower limit, and the load power is higher than $S_L^{B\sim AB}$. The transformers should be adjusted by the method that transformer taps are lowered first, the capacitors are switched on, and meanwhile, transformers A and B operate in parallel.

If the points are in Zone 36, then the voltage is acceptable, the power factor is out of the lower limit, and the load power is higher than $S_L^{B\sim AB}$. The transformers should be adjusted by the method that the capacitors are switched on, and meanwhile, transformers A and B operate in parallel.

If the points are in Zone 37, then the voltage is out of the lower voltage limit, the power factor is out of the lower limit, and the load power is higher than $S_L^{B\sim AB}$. The transformers should be adjusted by the method that capacitors are switched on, transformer taps are raised, and meanwhile, transformers A and B operate in parallel.

If the points are in Zone 38, then the voltage is out of the lower voltage limit, the power factor is acceptable, and the load power is higher than $S_L^{B\sim AB}$. The transformers should be adjusted by the method that transformer taps are raised, and meanwhile, transformers A and B operate in parallel.

If the points are in Zone 38, then the voltage is acceptable, the power factor is acceptable, and the load power is higher than $S_L^{B\sim AB}$. The transformers should be adjusted by the method that transformer taps are kept in the original position, the capacitors remain in the same condition, and meanwhile, transformers A and B operate in parallel.

The three-dimensional zone diagram projection method is as follows:

After one parameter of the voltage, the reactive power factor and the substation load is omitted in the three-dimensional zone diagram constructed in Step 3, plane projections of the other two parameters can be obtained:

When the S-cos φ plane is projected, $U_L$ represents low critical voltage, and $U_H$ represents high critical voltage. When the voltage is between $U_L$ and $U_H$, downward vertical projection is performed at 90 degrees, and a projection in the shape of a two-dimension nine-zone diagram is obtained. When the voltage U is not between $U_L$ and $U_H$, the projection angle α changes with U. When U is more than $U_H$, the projection angle is an acute angle, and the projection shape is shown in FIG. 16. When S is less than $U_L$, the projection angle is an obtuse angle, and the projection shape is shown in FIG. 17. Projection should be performed at α, so the projection angle α is calculated with the following formula:

$$\tan\alpha = \frac{U - (U_H - U_L)}{U} \quad (2)$$

The 90° projection angle is obtained by adjusting parameters of the projection axis, and a two-dimensional zone diagram forms after projection. The two-dimensional zone diagram has the naming rule that the projection zone formed by downward vertical projection is represented with three digits separated by beelines, and the three digits are respectively code names of three sub-spaces along the ordinate of the three-dimensional zone diagram.

Operating conditions of the transformers are determined according to positions of points formed by the voltage and the reactive power factor in the two-dimensional zone diagram, and the transformers are adjusted by the following method:

If the points are in Zone 15/16/17, then the power factor is out of the lower limit, and the load power is lower than $S_L^{A\sim B}$. The transformers should be adjusted by the method that the capacitors are switched on, and transformer A operates independently.

If the points are in Zone 14/18/19, then the power factor is acceptable, and the load power is lower than $S_L^{A\sim B}$. The transformers should be adjusted by the method that the existing capacitors remain in the same condition, and transformer A operates independently.

If the points are in Zone 11/12/13, then the power factor is out of the upper limit, and the load power is lower than $S_L^{A\sim B}$. The transformers should be adjusted by the method that the capacitors are switched off, and transformer A operates independently.

If the points are in Zone 25/26/27, then the power factor is out of the lower limit, and the load power is between $S_L^{A\sim B}$ and $S_L^{B\sim AB}$. The transformers should be adjusted by the method that the capacitors are switched on, and transformer B operates independently.

If the point is in Zone 24/28/29, then the power factor is acceptable, and the load power is between $S_L^{A\sim B}$ and $S_L^{B\sim AB}$. The transformers should be adjusted by the method that the existing capacitors remain in the same condition, and transformer B operates independently.

If the points are in Zone 35/36/37, then the power factor is out of the lower limit, and the load power is higher than $S_L^{B\sim AB}$. The transformers should be adjusted by the method that the capacitors are switched on, and transformers A and B operate independently.

If the points are in Zone 34/38/39, then the power factor is acceptable, and the load power is higher than $S_L^{B\sim AB}$. The transformers should be adjusted by the method that the existing capacitors remain in the same condition, and transformers A and B operate independently.

If the points are in Zone 31/32/33, then the power factor is out of the upper limit, and the load power is higher than $S_L^{B\sim AB}$. The transformers should be adjusted by the method that the capacitors are switched off, and transformers A and B operate independently.

The other two projection methods are the same as the method above, no more tautology here.

The present invention has the advantages that a three-parameter control policy including voltage, power factor and substation load is adopted, and the control policy is simple, easy and clear; analysis of transformer operating conditions is simplified, optimal substation operation is realized, transformer loss is reduced, and economic benefits are increased.

DETAILED DESCRIPTION OF THE PREFERRED EMBODIMENT

The present invention is further described by figures and the embodiment as follows.

In the embodiment, the load of a power administration at 11 o'clock on Jun. 25, 2008 is taken as an example to describe the transformer control method based on three-dimensional zone diagram policy. In the embodiment, the operating mode of transformers is that #2 transformer operates independently. The active power of the substation is 91.8068 MW, the reactive power of the substation is 44.5795 Mvar, and average voltage on the low voltage side is 65.69 KV.

Figure 1:
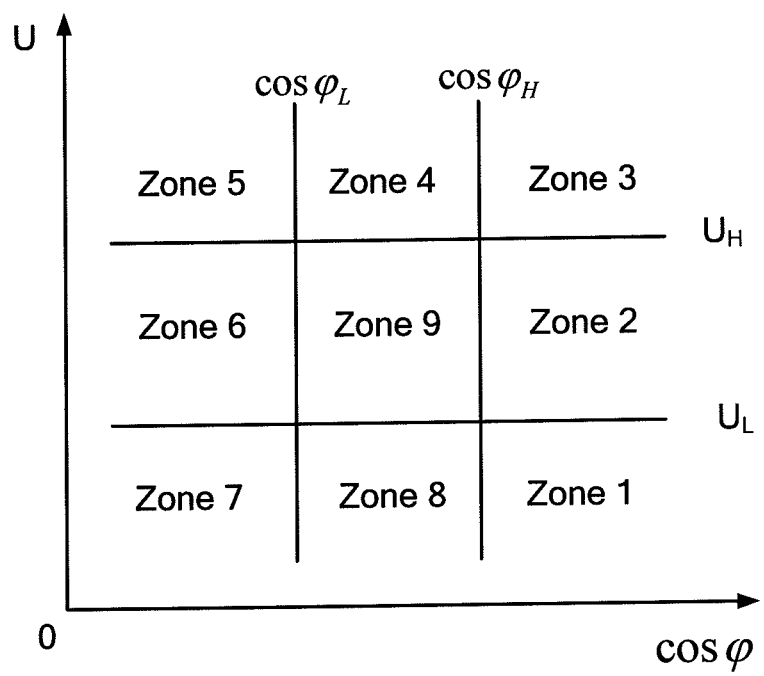
FIG. 1 is the nine-zone structural diagram for the transformer control method based on three-dimensional zone diagram policy in the prior art.
Figure 2:
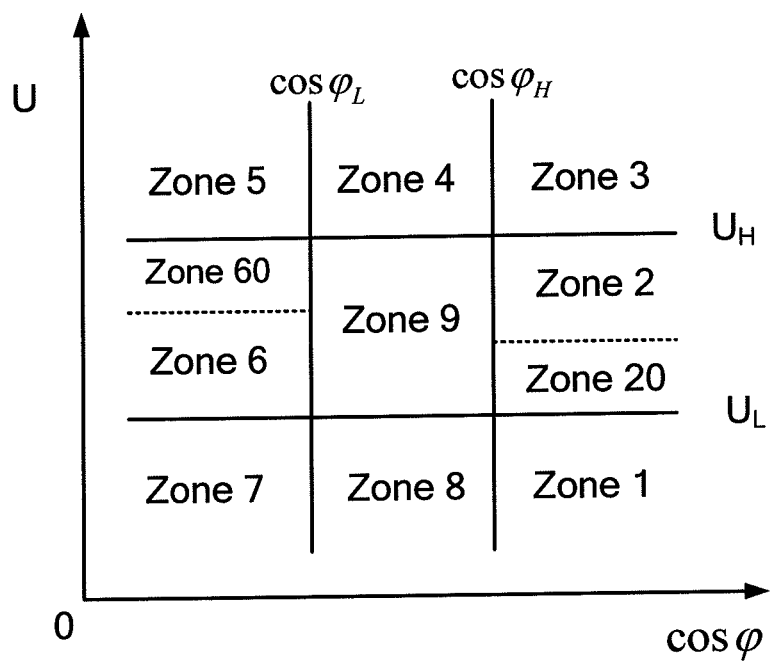
FIG. 2 is the eleven-zone structural diagram for the transformer control method based on three-dimensional zone diagram policy in the prior art.
Figure 3:
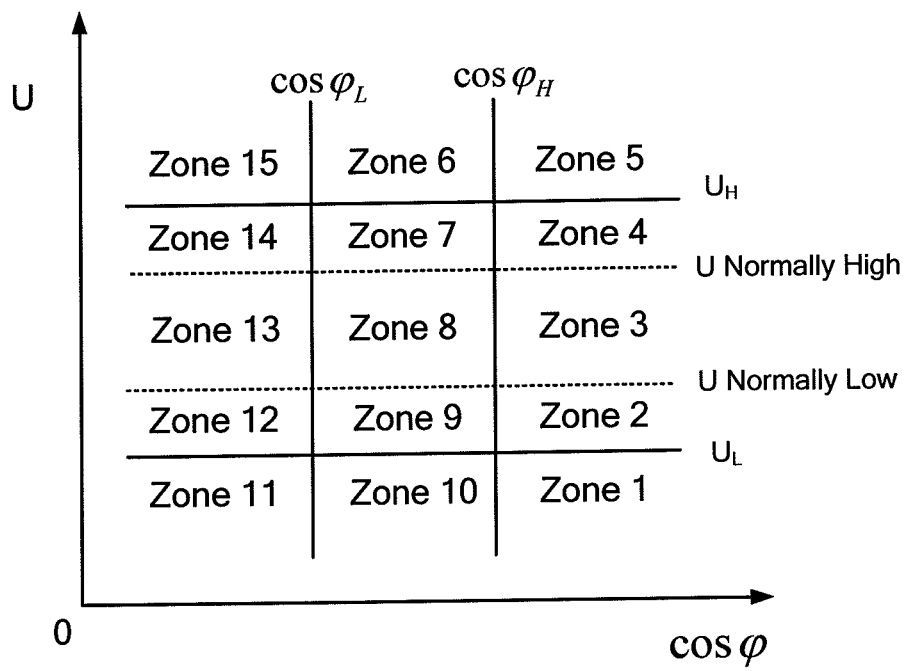
FIG. 3 is the fifteen-zone structural diagram for the transformer control method based on three-dimensional zone diagram policy in the prior art.
Figure 4:
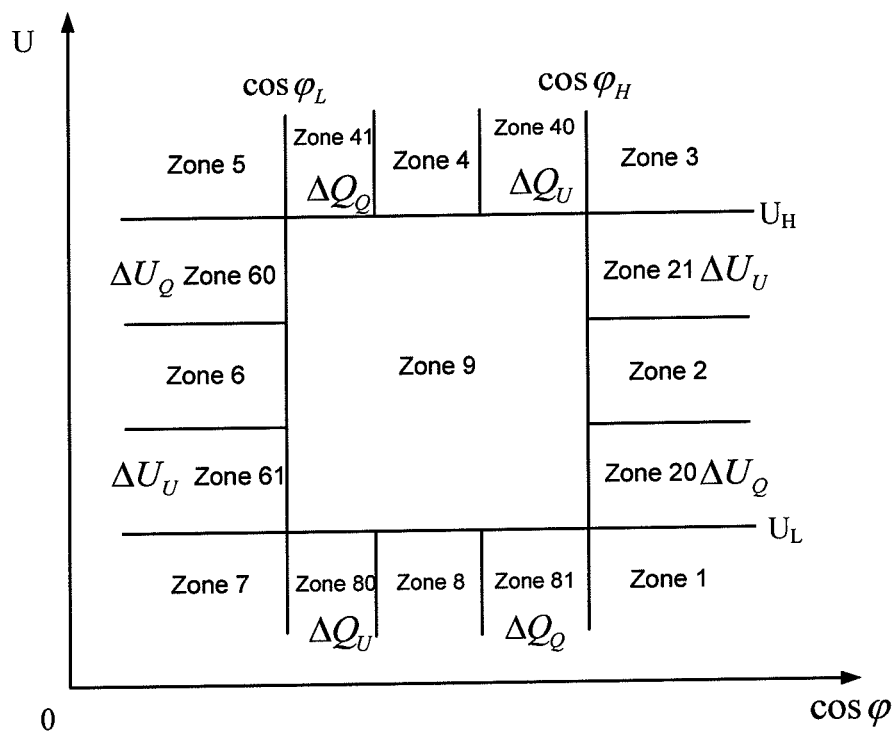
FIG. 4 is the seventeen-zone structural diagram for the transformer control method based on three-dimensional zone diagram policy in the prior art.
Figure 5:
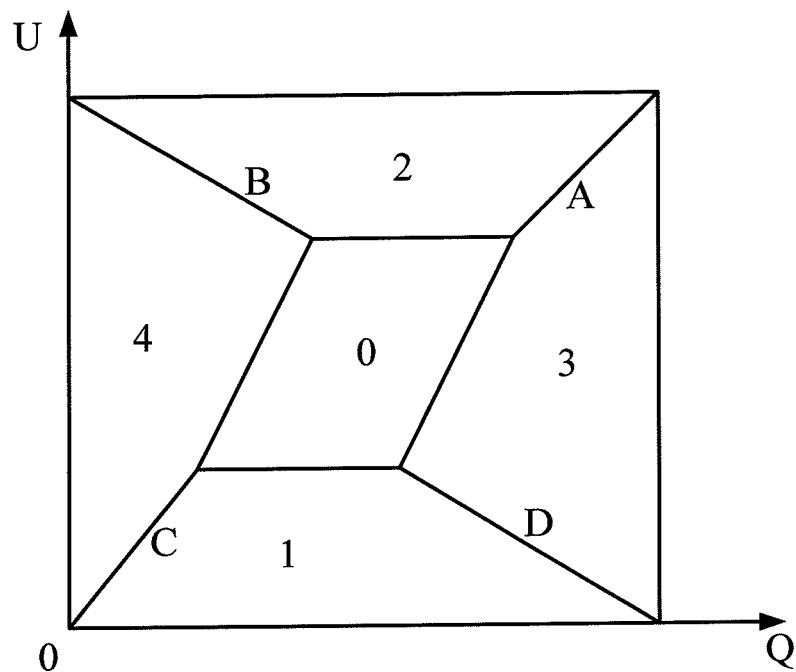
FIG. 5 is the five-zone structural diagram for the transformer control method based on three-dimensional zone diagram policy in the prior art.
Figure 6:
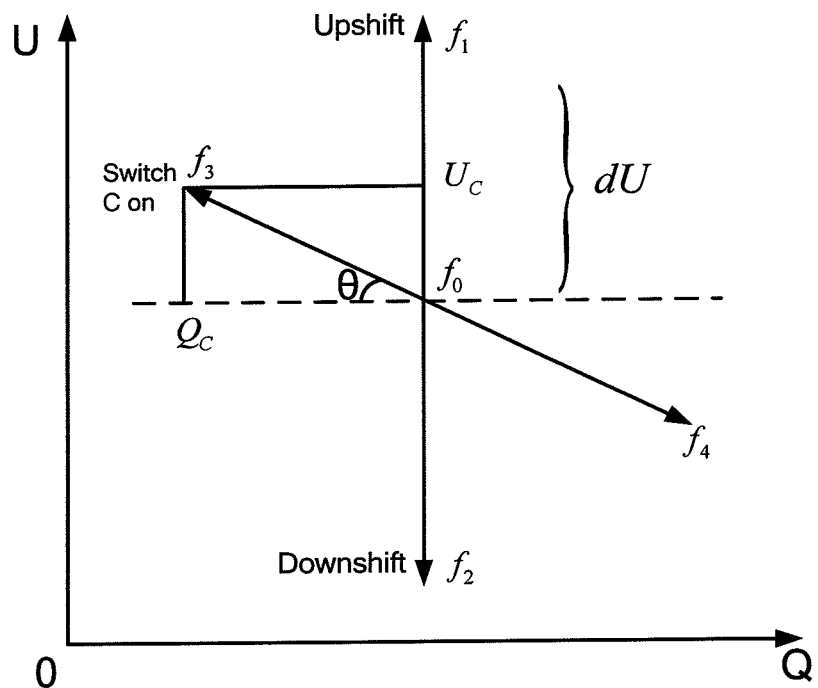
FIG. 6 is the five-zone vector diagram for the transformer control method based on three-dimensional zone diagram policy in the prior art.
Figure 7:
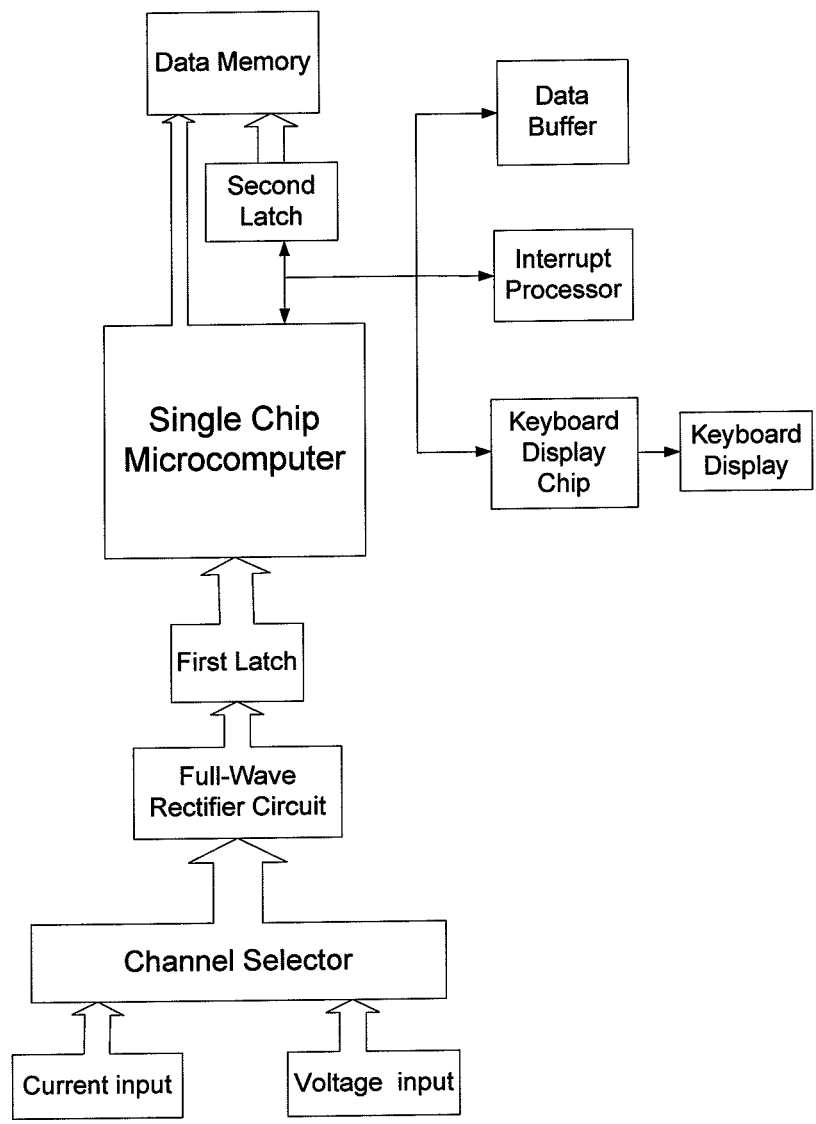
FIG. 7 is the block diagram of the transformer control device based on three-dimensional zone diagram policy in the present invention.

In the embodiment, the block diagram of a transformer control device based on three-dimensional zone diagram policy is shown in FIG. 7. The single-chip microcomputer is of a 87C552 type, the latches are of a 74LS373 type, and the data buffer is of a 8155 type; the data memory is of a 28C512 type, the interrupt processing module chip is of a MC146818 type, and the keyboard display chip is of a 8279 type; the channel selector is of a 74HC4051 type, the current transformer is of a LZZBJ9-12 or TR0140-IC type, and the voltage transformer is of a JDZ10-10 or TR1140-IC type.

Figure 8:
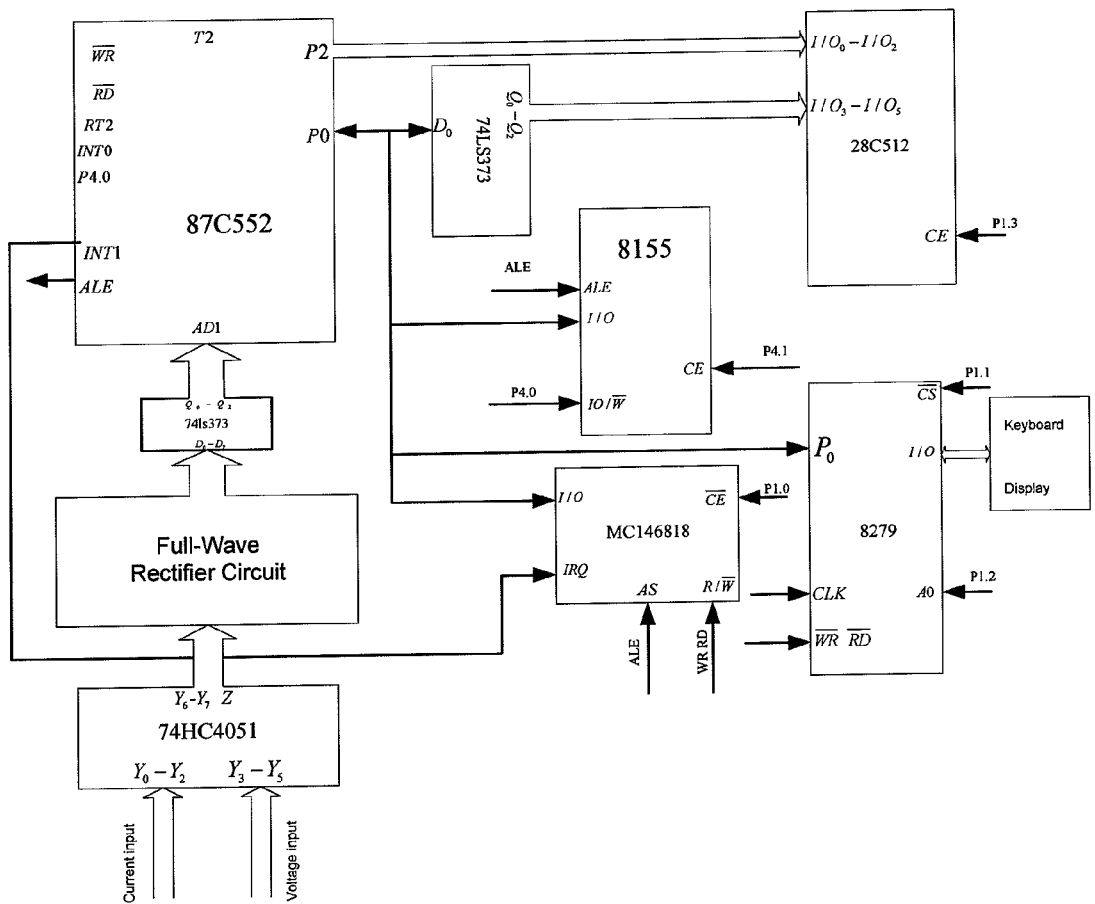
FIG. 8 is the schematic circuit diagram of the transformer control device based on three-dimensional zone diagram policy in the present invention.
Figure 9:
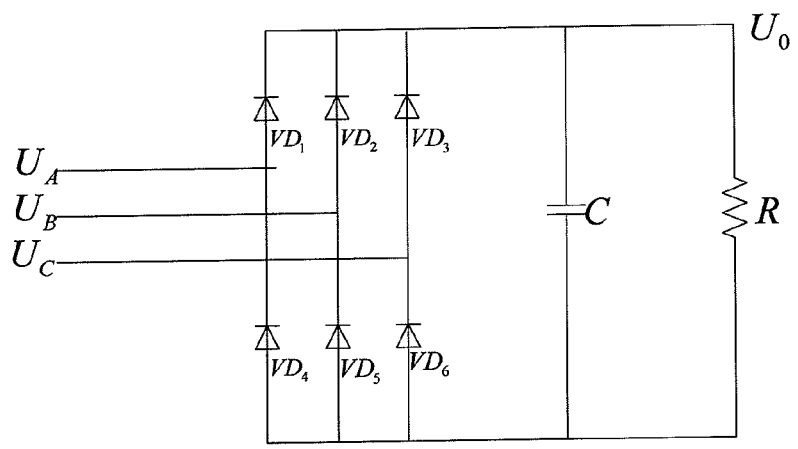
FIG. 9 is the schematic circuit diagram of the rectifier of the transformer control device based on three-dimensional zone diagram policy in the present invention.

As shown in FIG. 8 and FIG. 9, Q0-Q3 of the first latch is connected with AD1 of 87C552, D0 of the second latch is connected with P0 of 87C552, and P2 of 87C552 is connected with I/O$_3$-I/O$_5$ of 28C512; P0 of 87C552 is connected with I/O of 8155, and P0 and INT1 of 87C552 are connected with I/0 and IRQ of MC146818.

Current sensor and voltage sensor sampling process is as follows: Continuously sampling single-phase output signals of the voltage transformer and the current transformer alternatively in one half of the obtained signal cycle 0. During single-phase sampling, the zero crossing point of the voltage sensor output signal is detected firstly (if the A/D conversion value is within a range, the zero crossing point is the zero point). If a zero crossing point is detected, sampling data are recorded right now. After the voltage is collected at that moment, the current is sampled immediately. Then, a second sampling is performed after a few cycles, so that 50 sampling data are respectively collected. Next, zero crossing is determined until a zero point is detected again, and the single-phase sampling ends.

The interrupt processing module MC146818 has the following interrupt processing procedures that MC146818 is initially set to have one interruption every one second. During the interruption, the system is checked for power failure first by copying the time (hour, minute and second) in the MC146818 time zone to the user random access memory of MC146818 (the random access memory is power by batteries, so RAM data are not lost during blackout). In normal conditions, the time in the time zone is one second later than the copied time during next interruption. If the system is powered off, time copy stops even if MC146818 still operates. Therefore, when interruption occurs, blackout can be determined by comparing the time in the time zone and the copied time. If blackout occurs, the copied time is the start time of blackout, and the time in the time zone must be the end time of blackout. When blackout is detected, the start time and the end time should be marked with special data and written to 28C512, and then, next time copy is performed. In normal conditions without blackout, time copy is performed directly, and then, the copied time is stored in the fixed unit of 28C512.

Figure 10:
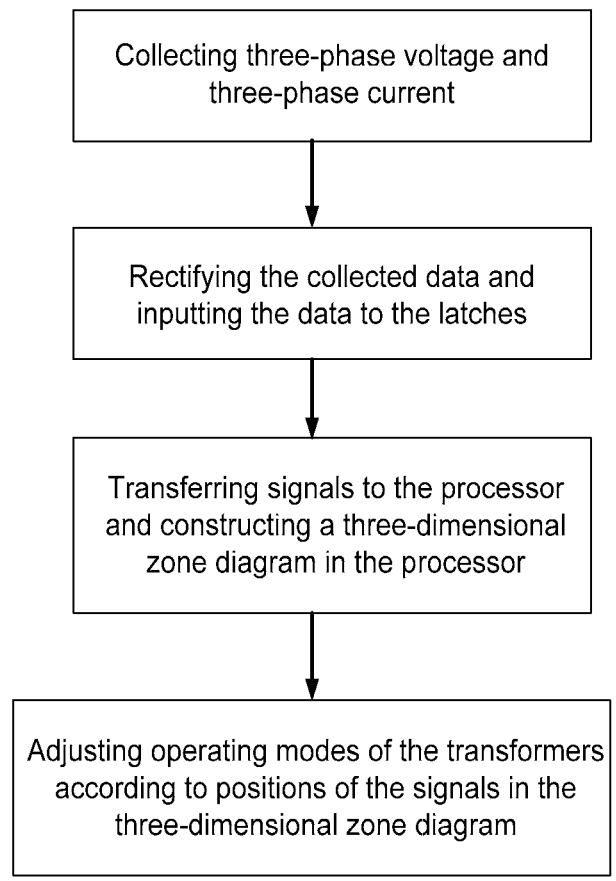
FIG. 10 is the flow chart of the transformer control method based on three-dimensional zone diagram policy in the present invention.

In the embodiment, the flow chart of a transformer control method based on three-dimensional zone diagram policy is shown in FIG. 10. The method comprises the following steps of:

Step 1: Collecting voltage data and current data, and calculating the power factor as shown in Table 1.

TABLE 1

Collected Voltage and Current

| Voltage/KV | Current/A | Power Factor |
|---|---|---|
| 66.5 | 125.6 | 0.922194 |
| 67.8 | 125.8 | 0.940554 |
| 68.1 | 126.1 | 0.919923 |
| 66.6 | 125.6 | 0.961524 |

Step 2: Storing the first set of collected voltage data 66.5 KV to the latches; after one cycle, storing the first set of collected current data to the latches; after one more cycle, storing the first set of power factor 0.922194 to the latches; outputting the three data simultaneously from the latches when the first set of power factors enters the latches. The voltage data are the first to enter the latches and are stored in the latches for two cycles, so the voltage data are different from voltage data transmitted in real time after two cycles when the power factors enter the latches. Therefore, compensation on the voltage data in the latches is necessary. The current data principle is the same as the voltage data principle. The current data enter the latches one cycle earlier than the power factor data, so compensation is also necessary by the formula as follows:

$$\frac{du}{dt} = \frac{\Delta u}{\Delta t} = \frac{u_N - u_0}{t_N - t_0} \quad (3)$$

Figure 11:
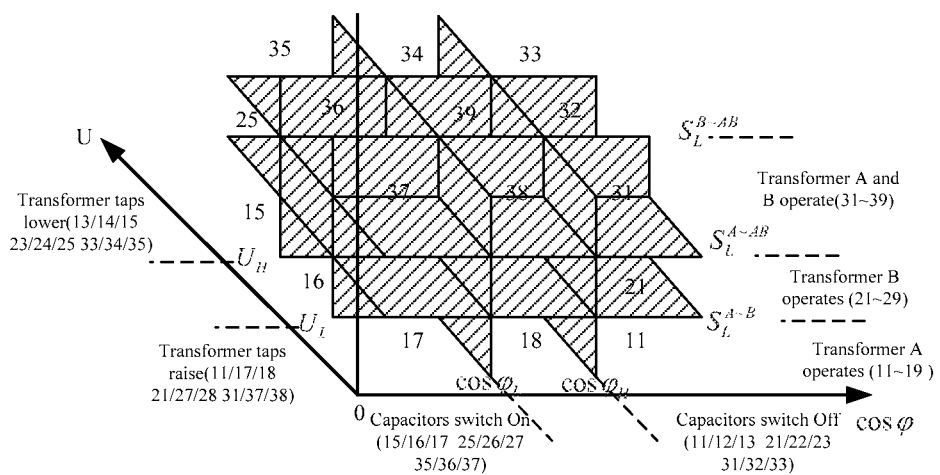
FIG. 11 is the three-dimensional zone structural diagram for the transformer control method based on three-dimensional zone diagram policy in the present invention.
Figure 12:
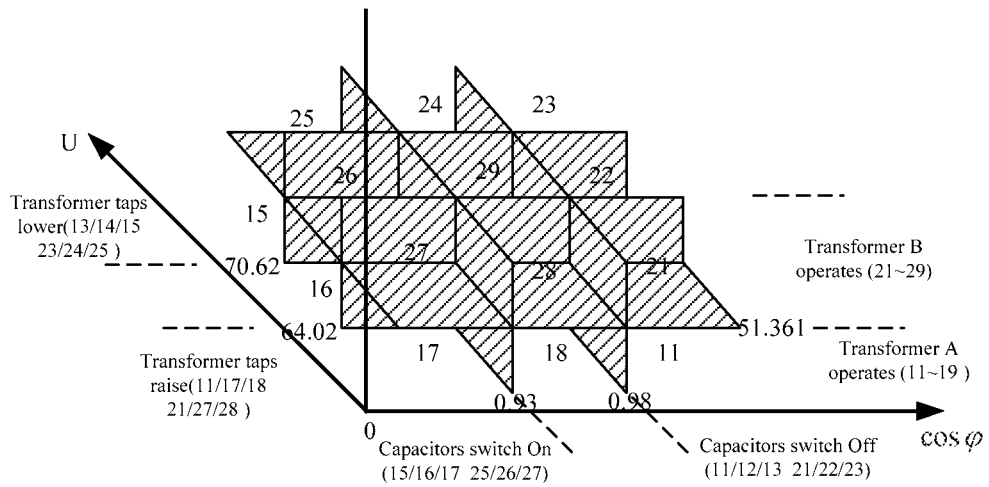
FIG. 12 is the power station three-dimensional zone diagram for the transformer control method based on three-dimensional zone diagram policy in the embodiment of the present invention.

Step 3: Transferring the data processed in Step 2 to the A/D converter of the processor, and constructing the three-dimensional zone diagram, as shown in FIG. 11 and FIG. 12;

Step 3-1: Constructing a three-dimensional coordinate system with the voltage, the power factor and the substation load.

Figure 13:
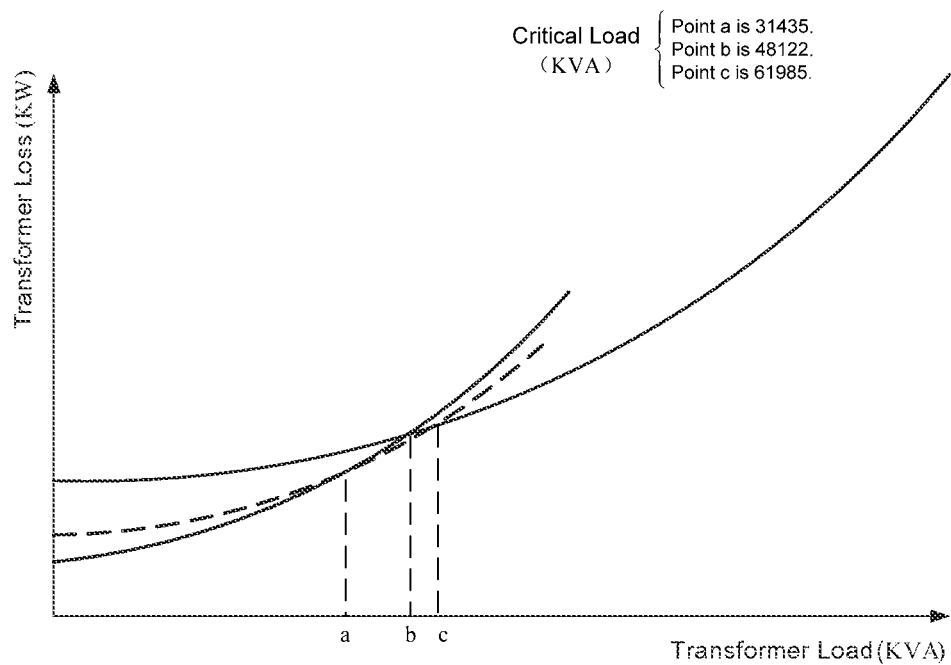
FIG. 13 is the substation load-comprehensive power loss curve for the transformer control method based on three-dimensional zone diagram policy in the embodiment of the present invention.
Figure 14:
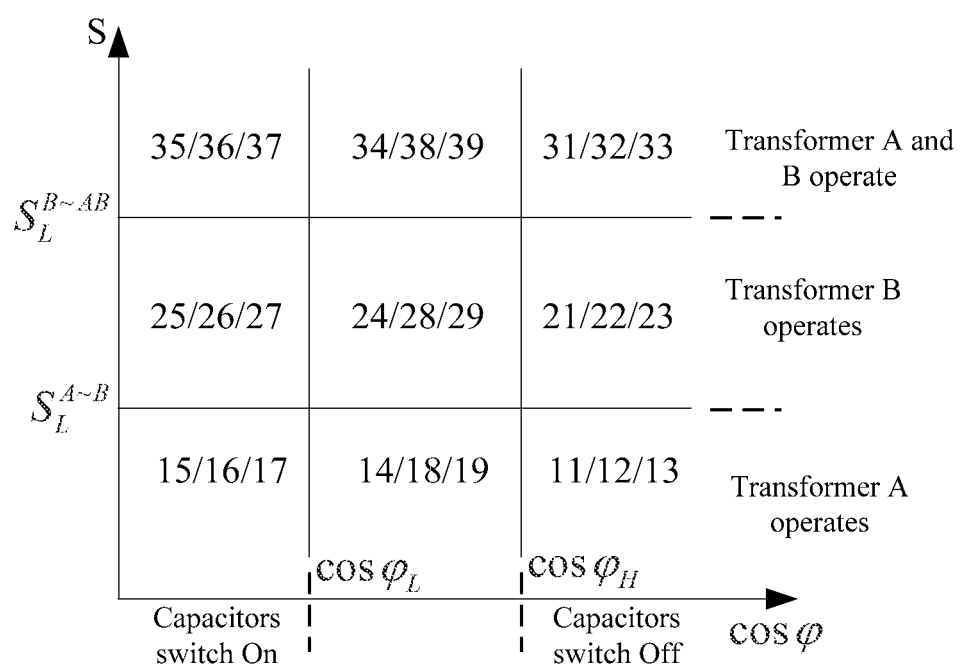
FIG. 14 is the projection of three-dimensional zone diagram for the transformer control method based on three-dimensional zone diagram policy on the cos φ-S plane in the present invention.

Step 3-2: Determining the critical load power limit as $S_L^{B\sim AB}=51.361$. The acceptable voltage range is as specified by the power administration. In general, the fluctuation range of the 66 KV voltage level is −3%~+7%, i.e. the acceptable voltage range is 64.02~70.62 KV. The acceptable power factor range is set as 0.93~0.98, so the threshold of the load S axis in the three-dimensional zone diagram is $S_L^{B\sim AB}$. As shown in FIG. 13, the S axis is divided into two zones. In this case, the three-dimensional zone diagram is divided into 18 sub-zones.

Step 3-3: Determining the voltage limits as $U_L=64.02$ and $U_H=70.62$;

Step 3-4: Determining the reactive power factor limits as cos $\phi_L=0.93$ and cos $\phi_H=0.98$;

If the three-dimensional zone diagram method is used, Step 4 is as follows:

The points formed by the voltage, the reactive power factor and the substation load in the three-dimensional zone diagram are in Zone 26. Therefore, the current substation is in the operating conditions that the voltage is acceptable, the power factor is out of the lower limit, and the load power is out of the threshold. When the transformer taps remain in the same position, in order to increase the power factor, the capacitors should be switched on to reduce the reactive power by the three-dimensional zone diagram method, and the operating mode of the transformers should be converted from independent operation of transformer B to parallel operation of transformers A and B.

Figure 15:
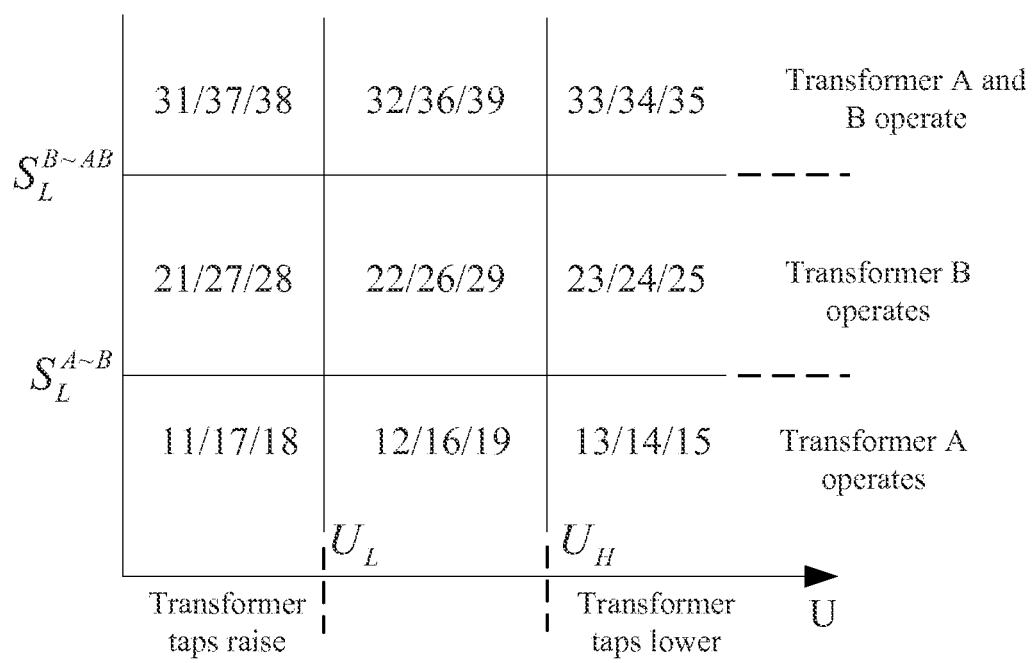
FIG. 15 is the projection of three-dimensional zone diagram for the transformer control method based on three-dimensional zone diagram policy on the U-S plane in the present invention.
Figure 16:
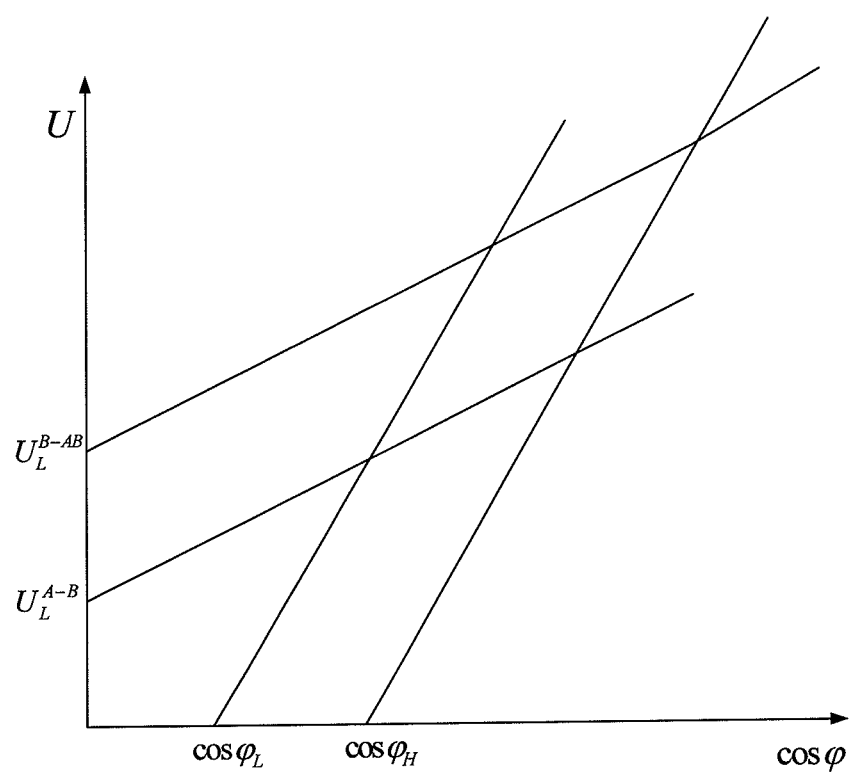
FIG. 16 is the projection shape schematic diagram of the transformer control method based on three-dimensional zone diagram policy in the present invention when S is more than $S_L^{B\sim AB}$.
Figure 17:
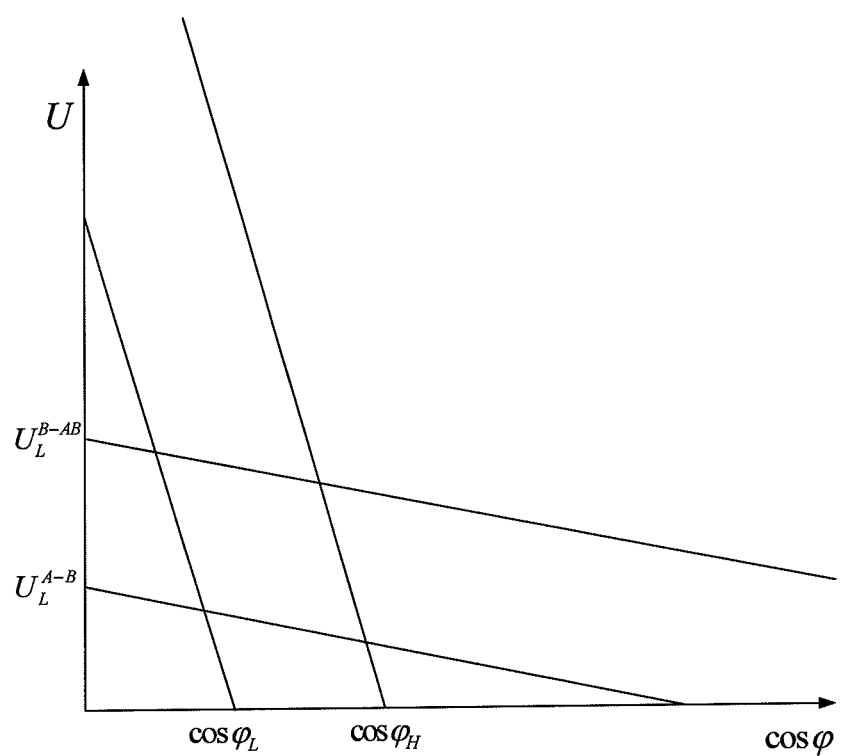
FIG. 17 is the projection shape schematic diagram of the transformer control method based on three-dimensional zone diagram policy in the present invention when S is less than $S_L^{A\sim B}$.

If the three-dimensional zone diagram projection method is used, Step 4 is as follows:

In the embodiment, projection of the U-S plane is used, as shown in FIG. 15. The projection formula is as follows:

$$\tan\alpha = \frac{\cos\varphi - (\cos\varphi_H - \cos\varphi_L)}{\cos\varphi} \quad (4)$$

When the projection angle is 90 degrees by adjusting the reactive power factor, operating conditions of the transformers are determined according to positions of points formed by the voltage and the substation load in the two-dimensional zone diagram, and the transformers are adjusted by the following method:

If the points are in Zone 11/17/18, then the voltage is out of the lower voltage limit, and the load power is lower than $S_L^{A\sim B}$. The transformers should be adjusted by the method that transformer taps are raised, and transformer A operates independently.

If the points are in Zone 12/16/19, then the voltage is acceptable, and the load power is lower than $S_L^{A\sim B}$. The transformers should be adjusted by the method that transformer taps are kept in the original position, and transformer A operates independently.

If the points are in Zone 13/14/15, then the voltage is out of the upper voltage limit, and the load power is lower than $S_L^{A\sim B}$. The transformers should be adjusted by the method that transformer taps are lowered, and transformer A operates independently.

If the points are in Zone 21/27/28, then the voltage is out of the lower voltage limit, and the load power is between $S_L^{A\sim B}$ and $S_L^{B\sim AB}$. The transformers should be adjusted by the method that transformer taps are raised, and transformer B operates independently.

If the points are in Zone 22/26/29, then the voltage is acceptable, and the load power is between $S_L^{A\sim B}$ and $S_L^{B\sim AB}$. The transformers should be adjusted by the method that transformer taps are kept in the original position, and transformer B operates independently.

If the points are in Zone 23/24/25, then the voltage is out of the upper voltage limit, and the load power is between $S_L^{A\sim B}$ and $S_L^{B\sim AB}$. The transformers should be adjusted by the method that transformer taps are lowered, and transformer B operates independently.

If the points are in Zone 31/37/38, then the voltage is out of the lower voltage limit, and the load power is higher than $S_L^{B\sim AB}$. The transformers should be adjusted by the method that transformer taps are raised, and transformers A and B operate in parallel.

If the points are in Zone 32/36/39, then the voltage is acceptable, and the load power is higher than $S_L^{B\sim AB}$. The transformers should be adjusted by the method that transformer taps are kept in the original position, and transformers A and B operate in parallel.

If the points are in Zone 33/34/35, then the voltage is out of the upper voltage limit, and the load power is higher than $S_L^{B \sim AB}$. The transformers should be adjusted by the method that transformer taps are lowered, and transformers A and B operate in parallel.

What is claimed is:

1. A transformer control device based on a three-dimensional zone diagram policy, comprising: a current input, a voltage input, a channel selector, a rectifier, a single-chip microcomputer, a data memory, an interrupt processor, a data buffer, and a keyboard display chip, wherein the transformer control device further comprises a first latch and a second latch, an output terminal of the current input is connected with a first input terminal of the channel selector, an output terminal of the voltage input is connected with a second input terminal of the channel selector, an output terminal of the channel selector is connected with an input terminal of the rectifier, an output terminal of the rectifier is connected with an input terminal of the first latch, an output terminal of the first latch is connected with an input terminal of the single-chip microcomputer, an input/output terminal of the single-chip microcomputer is connected with an input/output terminal of the second latch, an output terminal of the single-chip microcomputer is connected with a first input terminal of the data memory, an first output terminal of the second latch is connected with a second input terminal of the data memory, a second output terminal of the second latch is connected with an input terminal of the data buffer, a third output terminal of the second latch is connected with an input terminal of the keyboard display chip, and a fourth output terminal of the second latch is connected with an input/output terminal of the interrupt processor.

2. A transformer control method based on a three-dimensional zone diagram policy, wherein the transformer control device based on the three-dimensional zone diagram policy as claimed in claim 1 is used to control a transformer A and a transformer B in a power system, and said transformer control method comprises the following steps of:

Step 1: collecting three-phase voltage data and three-phase current data in the power system;

Step 2: rectifying signals of the three-phase voltage data and the three-phase current data collected in Step 1, and transferring the data to the latches in a time-transfer method; said time-transfer method comprises the following steps of: directly transferring a set of original three-phase voltage data to the latches; after one cycle, transferring collected real-time current data to the latches; after one more cycle, transferring power data to the latches; and outputting the three sets of data from the latches while the power data enter the latches;

wherein when the three-phase voltage data in the latches are not equal to the real-time voltage data after 2 cycles, compensation is needed; the voltage compensation formula is as follows:

$$\frac{du}{dt} = \frac{\Delta u}{\Delta t} = \frac{u_N - u_0}{t_N - t_0} \quad (1)$$

Where $\Delta u$=Voltage variation in the 2 cycles; $\Delta t$=2 cycles; $u_N$=Current voltage; $u_0$=Latched voltage; $t_N$=Current time; $t_0$=Voltage latching time;

when the current data in the latches are not equal to real-time current data after 1 cycle, compensation is needed; the current compensation formula is as follows:

$$\frac{di}{dt} = \frac{\Delta i}{\Delta t'} = \frac{i_N - i_0}{t'_N - t'_0}$$

Where $\Delta i$=Current variation after 1 cycle; $\Delta t'$=1 cycle; $i_N$=Present current; $i_0$=Latched current; $t'_N$=Current time; $t'_0$=Current latching time;

Step 3: transferring the data processed in Step 2 to an A/D converter of the single-chip microcomputer to convert analog signals to digital signals, and constructing a three-dimensional zone diagram in the single-chip microcomputer;

wherein said three-dimensional zone diagram means a three-dimensional zone diagram comprising three coordinate axes of three-phase voltage U, reactive power factor COS φ and substation load S;

said three-dimensional zone diagram is named by the following rule: (a) number sequence in each layer is the same as that of traditional nine-zone diagrams; (b) serial numbers of the S axis are sequenced in an ascending order along the forward of the S axis according to critical load power; when the S axis is divided into N sections, the bottom serial number is 1, and the top serial number is N; said critical load means the load value when the operating mode of a transformer changes;

In the three-dimensional zone diagram, each zone number includes double digits, wherein the first digit represents the layer of the S axis, and the second digit represents the position of the zone in the layer; therefore, 9 zones in the bottom layer are numbered from 11 to 19, 9 zones in the middle layer are numbered from 21 to 29, and 9 zones in the top layer are numbered from 31 to 39;

said method for constructing a three-dimensional zone diagram comprises the following steps of:

Step 3-1: constructing a three-dimensional coordinate system with the three-phase voltage, the reactive power factor and the substation load;

Step 3-2: determining critical load power limits in the method that critical load is determined according to parameters on the nameplate of a transformer, i.e. the critical load can be determined as long as the type of the transformer in a target substation is known;

Step 3-3: determining three-phase voltage limits in the following two methods:

(1) the upper voltage limit is set as the maximum acceptable positive offset or a value 2% less than the maximum offset, and the lower voltage limit is set as the maximum acceptable negative offset or a value 2% greater than the maximum negative offset; and (2) a time period is divided into several sub-periods, and voltage limits are set respectively based on the sub-periods; said time period can be 1 day, 1 week or 1 month;

the three-phase voltage limits determined in method (1) and method (2) are corrected in a contrary voltage control method; the contrary voltage control method is performed by increasing the center point voltage at the peak load and reducing the center point voltage at the trough load; compensation effects of contrary voltage control are optimized by making the voltage operate towards the upper limit at peak load and increasing the lower voltage limit, or making the voltage operate towards the lower limit at trough load and reducing the upper voltage limit;

Step 3-4: determining reactive power factor limits in the following two methods:
(1) reactive power factor limits are set as constant values in the following method:
the reactive power factor limits are set based on requirements of the substation for the power factor according to one of the following rules:
Rule 1: The upper power limit is set as 1, and the lower power limit is set as 0.9;
Rule 2: The lower limit of the reactive power is set as 0, and the upper limit of the reactive power is set as 1.3 times higher than reactive power of a single capacitor;
(2) reactive power limits are set with curves by dividing a time period into several sub-periods, and reactive power factor limits are set respectively based on the sub-periods; the time period can be 1 day, 1 week or 1 month;
Method (1) and method (2) above are corrected in the same contrary voltage control method as Step 3-3;
Step 4: determining transformer operating conditions according to points of the voltage, the reactive power factor and the substation load in the three-dimensional zone diagram, and adjusting the transformer in the three-dimensional zone diagram method and the three-dimensional zone diagram projection method, wherein the three-dimensional zone diagram method comprises the following steps of setting $S_L^{A \sim B}$ as the low critical load, and setting $S_L^{B \sim AB}$ as the high critical load;
if said points are in Zone 11, then the voltage is out of the lower voltage limit, the power factor is out of the upper limit, and the load power is lower than $S_L^{A \sim B}$; the transformers should be adjusted by the method that transformer taps are raised first, the capacitors are switched off, and meanwhile, transformer A operates independently;
if said points are in Zone 12, then the voltage is acceptable, the power factor is out of the upper limit, and the load power is lower than $S_L^{A \sim B}$; the transformers should be adjusted by the method that the capacitors are switched off, and meanwhile, transformer A operates independently;
if said points are in Zone 13, then the voltage is out of the upper voltage limit, the power factor is out of the upper limit, and the load power is lower than $S_L^{A \sim B}$; the transformers should be adjusted by the method that the capacitors are switched off, transformer taps are lowered, and meanwhile, transformer A operates independently;
if said points are in Zone 14, then the voltage is out of the upper voltage limit, the power factor is acceptable, and the load power is lower than $S_L^{A \sim B}$; the transformers should be adjusted by the method that transformer taps are lowered, and meanwhile, transformer A operates independently;
if said points are in Zone 15, then the voltage is out of the upper voltage limit, the power factor is out of the lower limit, and the load power is lower than $S_L^{A \sim B}$; the transformers should be adjusted by the method that transformer taps are lowered, the capacitors are switched on, and meanwhile, transformer A operates independently;
if said points are in Zone 16, then the voltage is acceptable, the power factor is out of the lower limit, and the load power is lower than $S_L^{A \sim B}$; the transformers should be adjusted by the method that the capacitors are switched on, and meanwhile, transformer A operates independently;
if said points are in Zone 17, then the voltage is out of the lower voltage limit, the power factor is out of the lower limit, and the load power is lower than $S_L^{A \sim B}$; the transformers should be adjusted by the method that capacitors are switched on, transformer taps are raised, and meanwhile, transformer A operates independently;
if said points are in Zone 18, then the voltage is out of the lower voltage limit, the power factor is acceptable, and the load power is lower than $S_L^{A \sim B}$; the transformers should be adjusted by the method that transformer taps are raised, and meanwhile, transformer A operates independently;
if said points are in Zone 19, then the voltage is acceptable, the power factor is acceptable, and the load power is lower than $S_L^{A \sim B}$; the transformers should be adjusted by the method that transformer taps are kept in the original position, the capacitors remain in the same condition, and meanwhile, transformer A operates independently;
if said points are in Zone 21, then the voltage is out of the lower voltage limit, the power factor is out of the upper limit, and the load power is between $S_L^{A \sim B}$ and $S_L^{B \sim AB}$; the transformers should be adjusted by the method that transformer taps are raised first, the capacitors are disconnected, and meanwhile, transformer B operates independently;
if said points are in Zone 22, then the voltage is acceptable, the power factor is out of the upper limit, and the load power is between $S_L^{A \sim B}$ and $S_L^{B \sim AB}$; the transformers should be adjusted by the method that the capacitors are switched off, and meanwhile, transformer B operates independently;
if said points are in Zone 23, then the voltage is out of the upper voltage limit, the power factor is out of the upper limit, and the load power is between $S_L^{A \sim B}$ and $S_L^{B \sim AB}$; the transformers should be adjusted by the method that the capacitors are switched off first, transformer taps are lowered, and meanwhile, transformer B operates independently;
if said points are in Zone 24, then the voltage is out of the upper voltage limit, the power factor is acceptable, and the load power is between $S_L^{A \sim B}$ and $S_L^{A \sim AB}$; the transformers should be adjusted by the method that transformer taps are lowered, and meanwhile, transformer B operates independently;
if said points are in Zone 25, then the voltage is out of the upper voltage limit, the power factor is out of the lower limit, and the load power is between $S_L^{A \sim B}$ and $S_L^{B \sim AB}$; the transformers should be adjusted by the method that transformer taps are lowered first, the capacitors are switched on, and meanwhile, transformer B operates independently;
if said points are in Zone 26, then the voltage is acceptable, the power factor is out of the lower limit, and the load power is between $S_L^{A \sim B}$ and $S_L^{B \sim AB}$; the transformers should be adjusted by the method that the capacitors are switched on, and meanwhile, transformer B operates independently;
if said points are in Zone 27, then the voltage is out of the lower voltage limit, the power factor is out of the lower limit, and the load power is between $S_L^{A \sim B}$ and $S_L^{B \sim AB}$; the transformers should be adjusted by the method that capacitors are switched on, transformer taps are raised, and meanwhile, transformer B operates independently;
if said points are in Zone 28, then the voltage is out of the lower voltage limit, the power factor is acceptable, and the load power is between $S_L^{A \sim B}$ and $S_L^{B \sim AB}$; the transformers should be adjusted by the method that transformer taps are raised, and meanwhile, transformer B operates independently;

if said points are in Zone 29, then the voltage is acceptable, the power factor is acceptable, and the load power is between $S_L^{A\sim B}$ and $S_L^{B\sim AB}$; the transformers should be adjusted by the method that transformer taps are kept in the original position, the capacitors remain in the same condition, and meanwhile, transformer B operates independently;

if said points are in Zone 31, then the voltage is out of the lower voltage limit, the power factor is out of the upper limit, and the load power is higher than $S_L^{B\sim AB}$; the transformers should be adjusted by the method that transformer taps are raised first, the capacitors are switched off, and meanwhile, transformers A and B operate in parallel;

if said points are in Zone 32, then the voltage is acceptable, the power factor is out of the upper limit, and the load power is higher than $S_L^{B\sim AB}$; the transformers should be adjusted by the method that the capacitors are switched off, and meanwhile, transformers A and B operate in parallel;

if said points are in Zone 33, then the voltage is out of the upper voltage limit, the power factor is out of the upper limit, and the load power is higher than $S_L^{B\sim AB}$; the transformers should be adjusted by the method that the capacitors are switched off, transformer taps are lowered, and meanwhile, transformers A and B operate in parallel;

if said points are in Zone 34, then the voltage is out of the upper voltage limit, the power factor is acceptable, and the load power is higher than $S_L^{B\sim AB}$; the transformers should be adjusted by the method that transformer taps are lowered, and meanwhile, transformers A and B operate in parallel;

if said points are in Zone 35, then the voltage is out of the upper voltage limit, the power factor is out of the lower limit, and the load power is higher than $S_L^{B\sim AB}$; the transformers should be adjusted by the method that transformer taps are lowered first, the capacitors are switched on, and meanwhile, transformers A and B operate in parallel;

if said points are in Zone 36, then the voltage is acceptable, the power factor is out of the lower limit, and the load power is higher than $S_L^{B\sim AB}$; the transformers should be adjusted by the method that the capacitors are switched on, and meanwhile, transformers A and B operate in parallel;

if said points are in Zone 37, then the voltage is out of the lower voltage limit, the power factor is out of the lower limit, and the load power is higher than $S_L^{B\sim AB}$; the transformers should be adjusted by the method that capacitors are switched on, transformer taps are raised, and meanwhile, transformers A and B operate in parallel;

if said points are in Zone 38, then the voltage is out of the lower voltage limit, the power factor is acceptable, and the load power is higher than $S_L^{B\sim AB}$; the transformers should be adjusted by the method that transformer taps are raised, and meanwhile, transformers A and B operate in parallel;

if said points are in Zone 38, then the voltage is acceptable, the power factor is acceptable, and the load power is higher than $S_L^{B\sim AB}$; the transformers should be adjusted by the method that transformer taps are kept in the original position, the capacitors remain in the same condition, and meanwhile, transformers A and B operate in parallel;

wherein said three-dimensional zone diagram projection method is as follows:

after one parameter of the voltage, the reactive power factor and the substation load is omitted in the three-dimensional zone diagram constructed in Step 3, plane projections of the other two parameters can be obtained:

when the S-cos φ plane is projected, $U_L$ represents low critical voltage, and $U_H$ represents high critical voltage; when the voltage is between $U_L$ and $U_H$, downward vertical projection is performed at 90 degrees, and a projection in the shape of a two-dimension nine-zone diagram is obtained; when the voltage U is not between $U_L$ and $U_H$, the projection angle α changes with U, and projection is performed at α; said projection angle α is calculated with the following formula:

$$\tan\alpha = \frac{U - (U_H - U_L)}{U}$$

the two-dimensional zone diagram formed by projection is named by the following rule:

Projection zones formed by downward vertical projection are represented by three digits separated by slashes, and the three digits are respectively code names of 3 sub-spaces along the ordinate of the three-dimensional zone diagram;

operating conditions of the transformers are determined according to the positions of points formed by the voltage and the reactive power factor in the two-dimensional zone diagram, and the transformers are adjusted by the following method:

if said points are in Zone 15/16/17, then the power factor is out of the lower limit, and the load power is lower than $S_L^{A\sim B}$; the transformers should be adjusted by the method that the capacitors are switched on, and transformer A operates independently;

if said points are in Zone 14/18/19, then the power factor is acceptable, and the load power is lower than $S_L^{A\sim B}$; the transformers should be adjusted by the method that the existing capacitors remain in the same condition, and transformer A operates independently;

if said points are in Zone 11/12/13, then the power factor is out of the upper limit, and the load power is lower than $S_L^{A\sim B}$; the transformers should be adjusted by the method that the capacitors are switched off, and transformer A operates independently;

if said points are in Zone 25/26/27, then the power factor is out of the lower limit, and the load power is between $S_L^{A\sim B}$ and $S_L^{B\sim AB}$; the transformers should be adjusted by the method that the capacitors are switched on, and transformer B operates independently;

if said points are in Zone 24/28/29, then the power factor is acceptable, and the load power is between $S_L^{A\sim B}$ and $S_L^{B\sim AB}$; the transformers should be adjusted by the method that the existing capacitors remain in the same condition, and transformer B operates independently;

if said points are in Zone 35/36/37, then the power factor is out of the lower limit, and the load power is higher than $S_L^{B\sim AB}$; the transformers should be adjusted by the method that the capacitors are switched on, and transformers A and B operate independently;

if said points are in Zone 34/38/39, then the power factor is acceptable, and the load power is higher than $S_L^{B\sim AB}$; the transformers should be adjusted by the method that the existing capacitors remain in the same condition, and transformers A and B operate independently; and if said points are in Zone 31/32/33, then the power factor is out of the upper limit, and the load power is higher than $S_L^{B\sim AB}$; the transformers should be adjusted by the method that the capacitors are switched off, and transformers A and B operate independently.

* * * * *